United States Patent [19]

Barber, Jr.

[11] 3,860,565
[45] Jan. 14, 1975

[54] ENCAPSULATED ISOCYANURATE CATALYST

[75] Inventor: Loren L. Barber, Jr., Woodbury, Minn.

[73] Assignee: Minnesota Mining and Manufacturing Company, St. Paul, Minn.

[22] Filed: Oct. 1, 1973

[21] Appl. No.: 402,409

[52] U.S. Cl................. 260/77.5 NC, 204/157.1 S, 204/158 S, 204/159.11, 260/2.5 AW, 260/37 N, 260/77.5 AA
[51] Int. Cl............................................ C08g 22/00
[58] Field of Search............ 260/77.5 NC, 2.5 AW, 260/77.5 AA; 204/157.1 S, 158 S, 159.11

[56] References Cited
UNITED STATES PATENTS
3,455,848   7/1969   Yoncaskie et al.............. 117/100 A Primary Examiner—M. J. Welsh
Attorney, Agent, or Firm—Alexander, Sell, Steldt & DeLaHunt

[57] ABSTRACT

A one-part, room temperature-latent isocyanate-catalyst system trimerizable to polyisocyanurate is formed comprising an aromatic isocyanate having dispersed throughout liquid microcapsules of a catalyst for isocyanurate formation. The microcapsules have a permeable shell wall essentially of partially polymerized aromatic isocyanates which encapsulates the liquid catalyst at room temperature but on activation of the isocyanate-catalyst system by a suitable force the liquid catalyst permeates the shell wall, mixes with the polyisocyanate, and cures the isocyanate to a fully cured thermoset isocyanurate material.

20 Claims, No Drawings

ENCAPSULATED ISOCYANURATE CATALYST

BACKGROUND OF THE INVENTION

A. Field of the Invention

In one aspect, this invention relates to one-part isocyanate-catalyst systems curable to isocyanurate resins. In a further aspect, this invention relates to encapsulated catlaysts. In yet a further aspect, this invention relates to a process for encapsulating catalysts.

B. Prior Art

Isocyanurate resins and catalysts for forming same are known in the art, see Saunders and Frisch, *Polyurethanes: Chemistry and Technology*, Part I, pp. 94 – 97, Interscience Publishers, New York (1962), Examples of known isocyanate trimerization catalysts include tertiary amines, alkali metal hydroxides, alkali and alkaline earth metal salts of carboxylic acids, metal alkoxides, xanthate salts, quaternary ammonium hydroxides, etc.

Known catalysts for trimerizing isocyanates can be divided into two general classes. First, those which cause trimerization of isocyanate exothermically at room temperature and second, those which trimerize isocyanates only at elevated temperatures and prolonged reaction times. The first group lacks latency and therefore may be used only in two-part compositions. The second group of catalysts generally has a short shelf life, e.g. several weeks and requires long cure times, on the order of several hours at elevated temperatures.

Curable resin compositions containing encapsulated catalysts are known. Examples of such compositions are disclosed in U.S. Pat. No. 3,018,258 which teaches polyepoxide compositions containing capsules, having a hardened inactive colloid shell wall, e.g. gelatin, about a curing agent. Therefore, such compositions are substantially unreactive under normal temperatures, having a shelf life of several months, but cure on prolonged heating, e.g. 24 hours. U.S. Pat. No. 3,455,848 teaches stable compositions which contain an intimate mixture of polyurethane components, at least one of the components being in capsules having a shell wall of gelatin. On heating the composition, the encapsulated component reacts with the unencapsulated component or components to form a polyurethane.

U.S. Pat. No. 3,467,544 teaches resin compositions comprising an encapsulated polysulfide, the gelatin capsule wall contains a metal oxide catalyst suitable for curing the polysulfide, Upon rupture of the capsules, polysulfide is released contacting the catalyst, and curing takes place.

U.S. Pat. No. 3,505,254 teaches polysulfide compositions containing encapsulated metal oxide, which cures upon breaking the capsule shell walls which can be lignin sulfonates, phenol, formaldehyde penterythritrol esters, etc.

Processes for the microencapsulation of materials are well known. A general reference is *Capsule Technology and Microencapsulation*, Noyes Data Corp., Park Ridge. N. J. (1972). In these processes a polymer is caused to separate from a continuous liquid phase and form a solid shell wall about a liquid or solid particulate material suspended in the continuous phase. There are several general microencapsulation processes for accomplishing this. One such process is termed "simple coacervation" encapsulation. In this process a polymer separates from a solution of the polymer by the action of a precipitating agent, e.g. a salt, a non-solvent for the polymer, or the like which reduces the solubility of the polymer in the solvent. Patents describing such processes and their shell wall material include U.S. Pat. Nos. 1,800,458, hydrophobic colloids; 3,069,370; 3,116,206, polymeric zinc; 3,137,631, denatured proteins; 3,418,250, hydrophobic thermoplatic resins; and others. Another such process is "complex coacervation" microencapsulation. By this process a polymer having an electric charge of one polarity is caused to separate from solution by the addition of a polymer having the opposite polarity. Patents describing such processes include U.S. Pat. Nos. 2,800,457, complex colloid; 3,317,434, gelatin; 3,324,065; and others.

In another encapsulation process, a shell wall is formed about suspended particulate material by an interfacial polycondensation reaction. In this method, the material to be encapsulated is mixed with a solution of one component of a polycondensation reaction and the mixture dispersed in a nonsolvent for the mixture. To the resulting dispersion is added a second component of the polycondensation reaction. The subsequent reaction forms a shell wall of polycondensate about each dispersed droplet at its interface. Patents describing such processes include U.S. Pat. Nos. 3,516,725; 3,427,250; 3,565,818, 3,575,882; 3,577,515; 3,594,328; and others.

In a variation of the interfacial polymerization process, microencapsulation is by an interfacial addition polymerization. In this process, a particulate material is suspended in a solution of a polymerizable, ethylenically unsaturated compound in a solvent. This solvent is not a solvent for the polymer formed from unsaturated compound. The unsaturated compound is polymerized such as by the use of free radical initiators. The resulting polymer forms a shell wall about the suspended particulate material. Patents describing such processes include U.S. Pat. Nos. 3,516,725; 3,427,250; 3,565,818; 3,575,882; 3,577,515; 3,594,328; and others.

Applicant knows of no catalysts including the encapsulated catalysts described hereinbefore which are suitable for preparing a one-part isocyanate-catalyst system that has prolonged storage stability and a rapid cure.

BRIEF SUMMARY OF THE INVENTION

I have discovered a room-temperature latent, one-part, triggerable isocyanate-catalyst system which comprises: polyisocyanate material, e.g., polyisocyanates, diisocyanate, and isocyanate-terminated prepolymers, having dispersed therein an encapsulated liquid isocyanate trimerization catalyst having a viscosity greater than about 5000 centipoise at 25°C. The trimerization catalyst is encapsulated in a permeable capsule having a shell wall of partially polymerized isocyanate, said capsule being impermeable to the liquid catalyst at room temperature but permeable to said catalyst at about 75°C. The permeable capsules are formed by an in situ interfacial polymerization reaction with polyisocyanate material, the resulting capsules being dispersed throughout the isocyanate-terminated material and there is no need for the intermediate step of isolating the capsules as is common in prior art processes. The isocyanate-catalyst resin system can be triggered, that is rendered active for further reaction, by the application of an activating force, e.g. heat, ultrasonic waves, mechanical shear, polar solvents which cause permeation of the liquid catalyst through the shell wall. Release of the catalyst from the capsule then promotes a complete, rapid room temperature cure of the entire mass of isocyanate material to isocyanurate resin. Unexpectedly, the permeable, partially polymerized material is able to so effectively isolate the catalyst from the remainder of the polyisocyanate that the system can be stored at room temperature (or even somewhat higher temperatures) for months or even years yet curing is completed in minutes upon activation.

DESCRIPTION OF THE PREFERRED EMBODIMENTS

The isocyanate trimerization catalysts used in the latent, one-part, triggerable isocyanate-catalyst system of this invention comprise a viscous liquid catalyst solution, preferably a solution of an alkali metal salt of an organic acid encapsulated in microcapsules. The microcapsules are prepared in situ, in a polyisocyanate material, by the addition of the liquid catalyst to the polyisocyanate under conditions of shear. During catalyst addition, the polyisocyanate is maintained at a temperature above the melting point of the polyisocyanate material but below about 50°C., and preferably below about 40°C., to avoid premature trimerization of the polyisocyanate. The microcapsules prepared under these conditions have a shell wall which is essentially partially polymerized aromatic isocyanate. The wall is of such a nature that it contains the viscous solution of alkali metal salt at temperatures below about 50°C. However, at temperatures above about 75°C. the viscosity of the alkali metal salt solution is reduced to less than about 5,000 centipoise, allowing the alkali metal salt solution to penetrate the shell wall, mix with the isocyanate material, and initiate polymerization of the aromatic polyisocyanate material.

Upon isolation of the microcapsules from the isocyanate system the material of the capsule walls apparently reacts further to an essentially completely trimerized isocyanurate. The resulting capsule walls are less permeable to alkali metal salt solutions, even at temperatures above about 50°C., and activation of a system using these capsules would require temperatures above about 150°C. or higher.

Suitable alkali metal salts for use in a liquid catalyst solution are those alkali metal salts of organic acids having a $pK_a$ between about 2.5 and 10, preferably between about 3 and 6. The acids with a $pK_a$ of about 3 – 6 provide catalysts that are easily synthesized, give good shelf stability when dispersed in isocyanate materials, yet cure rapidly when activated.

Generally speaking, the alkali metal salts used in this invention are alkali metal salts of mono- or polycarboxylic acids and phenols having from 2 to about 8 carbon atoms and are preferably mono- and polycarboxylic acids having 2 to 5 carbon atoms. The alkali metal salts of organic acids having more than about 8 carbon atoms generally have a higher solubility in isocyanates, and the metal salt is extracted from droplets of catalyst solution before a coherent shell wall can be formed about the droplet. When it is desired to use acids having more than 8 carbon atoms this excessive solubility of the Na and K salts of such acids in isocyanates can at least partially be overcome by using the lithium salt of these acids.

Examples of suitable alkali metal salts for use in this invention include sodium lactate, potassium lactate, rubidium lactate, potassium glycolate, potassium hydroxyisobutyrate, potassium 2-hydroxypropionate, potassium acetate, potassium butyrate, sodium butyrate, lithium octoate, potassium cyanoacetate, dipotassium oxalate, disodium succinate, dilithium adipate, dipotassium adipate, potassium mandelate, disodium phthalate, sodium phenoxide, potassium p-chlorophenoxide, sodium m-cresoxide, and the like.

The solubility of the alkali metal salt catalysts in polyols is such that the catalyst solution will generally contain more than 15 percent by weight salts, preferably about 50 – 75 percent by weight or more. The resulting solutions will generally have a viscosity of at least 5,000 centipoise or greater at temperatures up to about 50°C., preferably a viscosity greater than about 100,000 centipoise at temperatures up to about 40°C. The lower viscosity materials yield microcapsules that give partially and nonhomogeneously cured resins even after prolonged heating at elevated temperatures. Furthermore the shelf stability of these systems is significantly reduced as compared to the higher viscosity liquid catalyst solutions.

Solvents which can be used to dissolve the alkali metal salts, to form a viscous catalysts solution, are generally polar organic compounds and preferably have a boiling point sufficiently higher than water so that the solvent can be made essentially anhydrous, i.e. have a water content of one percent or less, by azeotropic distillation. Examples of such solvents include lower polyhydric alcohols having 2 to about 8 carbon atoms, such as ethylene glycol, propylene glycol, glycerin, 1,4-butanediol, 1,2,4-butanetriol, 2,2'-oxydiethanol, 3,3'-oxydipropanol, 1,1,1-trimethylolpropane, 1,2,3-trimethylolpropane, and the like and mixtures of such polyhydric alcohols; formamide, N-methyl-formamide, ethylene carbonate, 4-butyrolactone, pyrrolidone, N-methyl pyrrolidone, and the like and mixtures of such solvents. The preferred solvents are the lower polyhydric alcohols, and glycerol is the most preferred.

A preferred catalyst solution is an alkali metal salt of lactic acid in glycerol. This catalyst solution, when dispersed in polyisocyanate, especially "Mondur" MRS, gives consistently good catalyst-containing capsules which are efficient in releasing the catalyst and giving cured resins with good physical properties, including thermal stability, hydrolytic stability and useful dielectric properties.

The catalyst solution can be directly synthesized by mixing the alkali metal salt and solvent or alternatively, the viscous catalyst solution may be prepared by reacting alkali metal salt precursors in a solution of the selected solvent to form the desired catalyst and subsequently azeotroping off any resulting water using an azeotroping fluid such as toluene to form a substantially anhydrous catalyst solution. After azeotroping, any remaining organic solvents can be removed, e.g. by means of vacuum distillation. For example, a potassium lactate-glycerol catalyst solution can be prepared by reacting an aqueous solution of lactic acid with potassium hydroxide in a minimum of water and glycerine. Toluene is added to the mixture, and the reaction vessel is fitted with a water separator. The solution is then azeotroped until no more water can be driven off the reaction mixture. At this point, the solution generally contains 1% or less of water. After the water is removed, the toluene is removed by reduced pressure distillation.

The encapsulation of the isocyanate trimerization catalyst solution using a polyisocyanate can be performed in batches or continuously. In any event, a unit capable of providing a fine dispersion of the catalyst solution in the aromatic polyisocyanate is required for encapsulation, such as a high shear mixing apparatus, e.g. a blender, which will break the catalyst solution into a very fine dispersion. After the catalyst solution is dispersed in the polyisocyanate, a capsule shell wall forms around each droplet of catalyst solution as a result of the reaction of the isocyanate at the droplet's surface. There is a catalyzed trimerization of the isocyanate to form isocyanurate, and polymerization of the glycol, when used as solvent, with isocyanate to form urethane or isocyanurate-modified urethane. During formation of the capsule wall, there is a mild exotherm, and the temperature of the system is controlled so that it does not rise above about 50°C. and preferably does not rise above about 40°C. to prevent premature triggering of the entire isocyanate-catalyst system. After the catalyst dispersion is formed, further blending is avoided to prevent rupture of the forming shell walls.

The capsules obtained are a distribution of sizes generally ranging from about 1 to 20 microns in diameter. Because the capsules are small they can be evenly dispersed throughout the isocyanate material to provide a rapid, complete cure when activated. The preferred range of capsule diameters is about 1 – 10 microns, these diameters being easily dispersed; however, larger and smaller capsules also give useful isocyanate-catalyst compositions. The larger diameter capsules are produced by lower shear and vice versa. The formed capsules may be produced in concentrations of about 0.1 – 30 percent by weight of catalyst in the isocyanate. The system can be diluted with more polyisocyanate to reduce the catalyst concentration present. The amount of catalyst contained in the diluted isocyanate-catalyst systems is generally about 0.1 – 5 percent by weight of the isocyanate material to be trimerized. Functionally stated, the amount of catalyst present is preselected to be that amount which will catalyze a particular isocyanate material to a fully cured isocyanurate resin. Simple empirical tests are adequate to show the amount of encapsulated catalyst needed in any given system.

The aromatic polyisocyanate materials which can be trimerized to isocyanurates with the encapsulated catalysts of this invention are known. Particularly useful isocyanates can be represented by the formula $R(NCO)_n$ where R is aryl or alkyl substituted alkaryl and n is 2 to 5 or higher. Examples of such isocyanates are 2,4- and 2,6-tolylene diisocyanates; 1,5-naphthalene diisocyanate; 4,4-diisocyantodiphenylmethane and 3,3'-dimethyl-4,4'-diphenylene diisocyanate. The so-called polymeric polyisocyanates can also be used, such as those obtained by phosgenation of polyamines, prepared by condensing formaldehyde with aromatic amines. Particularly useful polymeric polyisocyanates are the polymethylene polyphenyl polyisocyanates such as those sold commercially under the trademarks "Mondur" MR and MRS, (available from Mobay Co.), 901 and 390 P and "PAPI" (available from Upjohn). Lists of commercially available polyisocyanates are found in Kirk and Othmer, *Encyclopedia of Chemical Technology*, Vol. 12, 2nd Ed., pp. 46 – 47, Interscience Publishers (1967), and Appendix A of Saunders and Frisch, *Polyurethanes: Chemistry and Technology*, Part I, Interscience Publishers, New York (1962); and the polyisocyanate materials therein described can be used in this invention.

Urethane prepolymers, sometimes referred to as isocyanate-terminated prepolymers, can also be trimerized and are known (e.g. see U.S. Pat. Nos. 3,073,802 and 3,054,755), such prepolymers being prepared by reacting aromatic or so-called polymeric polyisocyanates with a polyol such as polyoxyalkylene polyol, typically polyoxypropylene glycol, using excess isocyanate. Mixtures of polyisocyanates or polyols can be used to prepare isocyanateterminated prepolymers. In addition to polyoxyalkylene polyols, polyesters and polyamides containing reactive hydroxyl groups can be used.

Suitable polyols for use in isocyanate-terminated urethane prepolymers can have varying molecular weights, for example between 90 and 3,000 or even as high as 5,000. Where a harder polyisocyanurate is desired, the polyol will generally have a hydroxyl equivalent weight of about 45 – 400 (i.e. 1 reactive hydroxyl group per 45 – 400 molecular weight of polyol). Where a softer, tougher polyisocyanurate is desired, the polyol will generally have a molecular weight of 400 to 1,000 or higher. The polyoxyalkylene polyols are generally condensates of ethylene, propylene or butylene oxides with glycerol, pentaerythritol, sorbitol, sucrose, methylglucosides or low molecular polyols, such as propylene glycol, tri-, tetra-, penta-, hexa-methylene glycols, 1,3-butylene glycol, 1,3(2-ethyl)hexanedoil, 2,2,4-trimethyl-1,3-pentanediol, trimethylol propane, 1,2,6-hexanetriol, or phenyldiisopropanolamine.

Where the isocyanate-terminated urethane prepolymer is made from polyisocyanate-polyol reaction mixtures, the mixtures can have NCO/OH equivalent ratios greater than 1, preferably at least 1.2/1 to 6/1. Generally, the greater the amount of isocyanurate in the resulting product the greater its hardness. The preferred products are those which are highly crosslinked by reason of having about 20% to 85% of the isocyanate groups in the reaction mixture converted to isocyanurate linkages or when moisture is present during polymerization, also urea linkages.

Where a more highly crosslinked polymer is desired, a polyol-diisocyanate starting mixture can include a conventional triisocyanate or triol. The mixture can also include modifying mono-isocyanates or alcohols such as 1,4-butane diol, butyl "Cellosolve", butyl "Carbitol" and oleyl alcohol to impart special properties to the polymer product, such as the degree of final hardness.

Filled resin products can be made by incorporating into the preformed isocyanate-catalyst system a host of different powderd, granular, particulate, fibrous or finely divided fillers such as clay, talc, glass beads or bubbles, metal powders, rubbery granular aggregate such as scrap rubber obtained from tires, pigments, e.g., titanium dioxide, carbon black, etc., diatomaceous earth, glass fibers and the like. The fillers can be added in amounts of 5 to 95 percent by weight of isocyanate material.

Many conditions are suitable for activating the one-part, encapsulated catalyst-isocyanate system of this invention, e.g. mechanical shear, thermal, solvent, ultrasonic, microwave and dielectric means. Successful thermal activation requires that the encapsulated composition be heated above ambient temperature, such as above 50°C. and preferably above about 75°C., for a sufficient length of time to achieve release of the catalyst from the capsule and initiate trimerization. Once trimerization is initiated, the reaction is exothermic and will continue to completion even though the activating condition is removed.

Solvents may be used to activate the catalyst-isocyanate system of this invention. A suitable amount of a polar solvent added to the system causes diffusion of the catalyst through the capsule shell wall. Examples of suitable activating solvents are dimethylformamide, N-methyl pyrrolidinone; dimethylsulfoxide, as well as polyols and alcohols. Monofunctional alcohols are generally not suitable activating agents since they react with isocyanate to chain terminate the prepolymer inhibiting trimerization, and primary and secondary aliphatic amines react with the isocyanate too rapidly to cause good diffusion of the isocyanate through the capsule shell wall.

Exposure of the isocyanate-catalyst system to microwave ultrasonic energy or other energy forms can cause sufficient release of the catalyst from the capsules to initiate polymerization.

Gel times of the isocyanate-catalyst system of this invention after activation are usually a few seconds with complete curing being achieved in a few minutes depending on the amount of catalyst released and the temperature of the cure.

The behavior of the encapsulated isocyanate-catalyst system is at variance with the behavior of prior art isocyanurate-catalyst systems or the prior art encapsulated systems. Prior art encapsulated systems require hours to initiate reaction when activated, in contrast to applicant's system which requires only a few seconds to minutes before gelling after activation.

The one-part encapsulated catalyst-polyisocyanate compositions of this invention are useful as adhesives, paints, coatings, and for use in reinforced laminates, e.g. plywood fabrication and patching, and composites. The laminates and composites can be prefabricated and the resin system activated in place by heating or other methods such as those disclosed hereinbefore.

A variety of fillers may be incorporated into the resin systems of this invention so that significantly higher viscosity prepolymer materials are obtained. Thixotropic characteristics may also be obtained when thixotropic agents, e.g. "Cabosil" are included in the formulations. These resin compositions, whether filled or unfilled, are capable of forming useful bonds to a variety of surfaces. Metals, e.g. aluminum, steel or copper and polymeric surfaces, e.g. polyesters, polyamides, polyimides, urethanes and rubbers can be adhered together using the resin systems. Good adhesive bonds may also be formed between metallic and polymeric surfaces.

Compositions which have been shown to be useful for repairing wood and plywood may be prepared in the following manner. A resin system of polyisocyanate containing about 2% by weight of the microencapsulated catalyst of the invention is compounded with a generally non-reactive granular or fibrous filler such as Cabosil, clay, barium, sulfate, mica, etc. Glass or plastic bubbles and pigments may also be added. The glass microbubbles or plastic microballoons are included to make a lighweight polyisocyanurate composition with improved staining characteristics. The other fillers present are useful for cost reduction, improved handling properties of the uncured resin, improved physical properties of the finally cured resin, and pigmentation. The exact amounts of the fillers that are employed may be varied from about 5 to 50 percent by volume of the cured composition depending upon the needed properties of the finally cured composition and the density of the filler. The resin-filler may be triggered by the same methods prevously described to give a useful patching composition.

Repair of imperfect plywood is carried out in the following way. A conventional plywood sheet with imperfections in the wood is prepared for patching by routing or removing a small amount of wood in the patch area so that a uniform cavity is obtained. This cavity may be as deep and wide as necessary to remove weak and undesirable-appearing wood from the sheet. The sheet is then heated for several seconds with a radiant heater to about 100°C. followed by addition of the patching composition while providing mechanical shear. Subsequent heating at 100° to 150°C. is performed until the triggered release of catalyst has occurred and sufficient curing has been obtained to make it possible to sand the patched area smooth; typically, 1 to 2 minutes. The entire plywood composition may then be stained with good color matching characteristics depending upon the filler used in the resin system.

The one-part isocyanate-catalyst systems of this invention may also be employed as one-part foam-producing compositions which are useful as void fillers and thermal insulators. Foams of low density can be prepared by incorporating blowing agents plus a surfactant into the preformed isocyanate-catalyst system. Examples of blowing agents are low boiling hydrocarbons, e.g. pentane, hexanes, heptane, octene; halogenated hydrocarbons such as dichlorodifluoromethane, dichlorodifluoroethane, trichlorofluoromethane, isopropylchloride, methylene chloride, etc. The density will vary depending on the blowing agent, surfactant and isocyanate-catalyst system used.

A further understanding may be had by reference to the following nonlimiting examples in which all parts are by weight unless otherwise noted.

EXAMPLE 1

A variable speed laboratory type "Waring Blender" having a capacity of approximately 1 liter was charged with 300 parts of Mondur MRS (polymethylene polyphenyl polyisocyanate, having an isocyanate functionality of about 2.7). The blender was turned on and its speed increased to maximum followed by the rapid addition of 40 parts of a solution containing 75 percent by weight potassium lactate in glycerol, (having a viscosity of 320,000 centipoise) over a period of about one-fourth minute. A fine dispersion of liquid catalyst droplets was formed in the isocyanate. The blender was stopped and the dispersion degassed in a vacuum desiccator. Upon standing at room temperature, an encapsulating shell formed around each droplet which occurred by reaction of the catalyst solution with isocyanate material. The resulting dispersion, an isocyanate-catalyst system concentrate, contained approximately 10 percent by weight encapsulated potassium lactate which could be used as a resin or diluted with more polyisocyanate or isocyanate-terminated prepolymer composition to form useful compositions.

Two parts of the isocyanate-catalyst system concentrate was diluted with 8 parts of an isocyanate-terminated prepolymer made by: reacting 75 parts of Mondur MRS with 25 parts of polyoxypropyleneglycol having a molecular weight of 2000 (available from Union Carbide Corporation as PPG "2025"). A portion of the mixture was cured by placing in an oven at 90°C. for 2 minutes. The resulting cured polyisocyanurate resin obtained had a Shore D hardness of 80 – 85.

One gram of 1-methyl pyrrolidinone was added to one 10 gram portion of isocyanate-catalyst system and 1 gram of dimethyl formamide was added to another 10 gram portion. In about 10 minutes both portions had cured to an isocyanurate resin plasticized by the activating solvent. Each cured resin had a Shore D hardness of about 65.

Samples of the system concentrate and isocyanate-diluted material did not show substantial polymerization when stored at temperatures under 50°C. for 18 months and more yet they retained their activity.

The isocyanate-capsule catalyst system concentrate was diluted with several volumes of toluene, filtered, washed, with hexane and dried to free-flowing microcapsules. On redispersion of these capsules to form a 2% concentration of catalyst in isocyanate material, the resulting system cured, at a reduced rate compared to systems contaiing non-dried capsules.

EXAMPLE 2

The process of Example 1 was repeated using 40 parts of the catalysts and solvents shown in Table 1 in place of 75% potassium lactate in glycerol; each of the solutions being added to 300 parts of Mondur MRS. All of the materials made an encapsulated catalyst suitable for catalyzing isocyanurate formation.

901, 300 parts of Isonate 390P and 300 parts of PAPI, for the Mondur MRS. The resulting isocyanate-catalyst system concentrates were diluted to about 1% catalyst concentration with isocyanate material in a manner similar to Example 1. The resulting systems cured in about 2 – 5 minutes to isocyanurate resins having 50 – 90 Shore D hardness when activated at temperatures between 90° and 100°C. and cured in 5 – 10 minutes when solvent activated with dimethylformamide, dimethylsulfoxide or N-methyl pyrrolidone.

EXAMPLE 4

Isocyanate-catalyst systems concentrates were prepared in a continuous process by pumping Mondur MRS polyisocyanate and 75% potassium lactate solution in glycerol through a continuous mixing blender. The blender, a variable speed "OAKES" blender, was fitted with two pumps which continuously fed isocyanate and catalyst into the blending head. The polyisocyanate flow rate was varied from 500 to 680 milliliters per minute, the lactate solution from 30 to 90 milliliters per minutes, and the shear setting from 4 to 9. In all combinations, the microcapsules obtained were similar in activity to those obtained in Example 1. The average size of the capsules ranged from 1 to 10 microns depending on the flow rates and the shear setting of the blender; the lower flow rates and higher shear settings giving smaller capsules sizes, and higher flow rates and lower shear settings giving larger capsules.

EXAMPLE 5

One hundred and sixty parts of an isocyanate-catalyst system concentrate prepared as in Example 4 using an isocyanate flow rate of 600 milliliters per minute, a lactate solution flow rate of 70 milliliters per minute, and a shear setting of 6 were added to 400 parts of an isocyanate-terminated urethane prepolymer (prepared

TABLE I

| Catalyst | Percent Catalyst is Solvent (by weight) | Solvent |
| --- | --- | --- |
| sodium lactate | 50 | glycerol |
| potassium lactate | 80 (1) | glycerol |
| potassium lactate | 75 | glycerol |
| potassium lactate (3) | 15 (2) | glycerol |
| potassium lactate | 50 | ethylene glycol |
| potassium lactate | 50 | propylene glycol |
| potassium lactate | 50 | oxydiethanol |
| rubidium lactate | 50 | glycerol |
| potassium glycolate | 50 | glycerol |
| potassium-hydroxyisobutyrate | 50 | glycerol |
| potassium p-Cl-phenoxide | 50 | glycerol |
| potassium mandelate | 50 | glycerol |
| complex of monopotassium ethylene-glycolate with trimethyl borate | 67 | ethylene glycol |
| potassium cyanoacetate | 33 | glycerol |
| potassium β-hydroxypropionate | 50 | glycerol |
| potassium β-hydroxybutyrate | 50 | glycerol |
| potassium acetate | 40 | glycerol |
| potassium ethyl xanthate | 40 | glycerol |
| potassium methoxy acetate | 50 | glycerol |
| potassium butyrate | 40 | glycerol |
| potassium lactate | 50 | dipropylene glycol |

(1) The 80% solution has a viscosity of about 900,000 centipoise at 25°C.
(2) The 15% solution has a viscosity of about 5,000 centipoise at 25°C.
(3) 80 parts of the catalyst-solvent was used for 300 grams MRS.

EXAMPLE 3

The procedure of Example 1 was repeated, substituting 300 parts of "Isonate" 143L, 300 parts of Isonate from equal amounts of Mondur MRS and a polyoxypropylene glycol having a molecular weight of 2000. The resulting mixture was degassed under 1 - 100 Torr. The one-part isocyanate-catalyst system obtained possessed a shelf life stability greater than one year yet cured in about 30 seconds when heat activated at 100°C.

A 10 gram sample of the isocyanate-catalyst system was placed in a small aluminum dish, heated at 150°C. in an oven for 2 minutes, removed from the oven and cooled to room temperature. The resulting resin had a Shore D hardness of 85 - 88.

A 10 gram sample of the isocyanate-catalyst system was cured by exposure to microwave energy having a wavelength of 2.45 GHz for 2 to 5 minutes using a Litton Microwave Oven. The resulting mixture cured in about 2 - 5 minutes to an isocyanurate-resin having a hardness of 60 to 65 Shore D.

A 10 gram sample of the isocyanate-catalyst system was cured by exposing the resin to ultrasonic energy ("BioSonic II Ultrasonic Probe" manufactured by Bronwill Scientific) producing 125 watts of ultrasonic energy at 200 kilocycles. The resulting mixture cured to an isocyanurate-urethane resin having a Shore D hardness of 80 to 90 in about 5 minutes.

EXAMPLE 6

A patching composition was prepared as follows:
74 parts of a system of an isocyanate-terminated prepolymer (prepared from 60% Mondur MRS and 40% polyoxypropylene glycol having 2000 molecular weight) containing 2% encapsulated potassium lactate by weight
6 parts glass bubbles - B-25-B (available from 3M Company)
16 parts clay
5 parts Burnt Umber 671 (available from Hercules Inc.)
2.5 parts red iron oxide
0.5 part carbon black The above ingredients were mixed until homogeneously dispersed and then degassed under vacuum prior to curing on the wood sample. The composition was used to fill imperfections in plywood and cured by exposure for a few seconds to radiant heat. The plywood patch could then be sanded and machined satisfactorily.

EXAMPLE 7

A patching composition was prepared as follows:
64 parts of the isocyanate-terminated prepolymer-catalyst mixture used in Example 6
32 parts clay
5 parts Burnt Umber 671 available from Hercules Inc.
2.5 parts red iron oxide
0.5 part carbon black The above ingredients were mixed until homogeneously dispersed and then degassed under vacuum to give a patching composition stable under storage conditions for a prolonged period of time (e.g., about 1 year). The composition was used to fill imperfections in plywood and cured by exposure to radiant heat for a few seconds. The dark colored patch could then be sanded, machined and painted satisfactorily.

EXAMPLE 8

A patching composition was prepared as follows:
74 parts of the isocyanate-terminated prepolymer-catalyst mixture used in Example 6
6 parts glass bubbles
20 parts clay
5 parts titanium dioxide After mixing and degassing the above ingredients, a composition was obtained which had prolonged stablity against polymerization under storage conditions. It was used to fill imperfections in wood and cured by radiant heat to provide repaired wood that was aesthetically appealing in appearance. The wood could be readily sanded, machined and painted on the repaired areas, providing uniform matching of properties between patched and unpatched areas.

EXAMPLE 9

An isocyanate-catalyst system was prepared by adding 1 part of isocyanate-encapsulated catalyst system concentrate prepared as in Example 1 to nine parts of tolylene diisocyanate endcapped polytetramethyleneglycol having an NCO equivalent weight of 450, (available from duPont as "Adiprene L-315"). The isocyanate-catalyst system possessed a shelf life greater than one year at room temperature.

Ten gram samples of the system placed in a forced air oven at 90°C., cured in about 2 minutes to a solid isocyanurate resin having a Shore D hardness of 55.

The isocyanate-catalyst system was used as an adhesive to bond natural rubber to steel by coating steel samples with a thin, about 1 mil, layer of resin, pressing a strip of natural rubber on the samples, and heating the assemblies for 5 minutes in an oven at 100°C. whereon the system cured to an isocyanurate resin. The following bond strengths were obtained:

| Temperature | Tensile Bond Strength |
|---|---|
| −20°F. (−28.9°C.) | 706 lbs./in.² (49.5 kg./cm.²) |
| 75°F. (23.9°C.) | 675 lbs./in.² (47.2 kg./cm.²) |
| 75°F. (23.9°C.) aged 14 days at 180°F. (82.2°C.) | 500 lbs./in.² (35 kg./cm.²) |
| 75°F. (23.9°C.) aged 14 days at 100°F. (37.8°C.) at 100% relative humidity | 450 lbs./in.² (31.5 kg./cm.²) |

EXAMPLE 10

Ten parts of an isocyanate-catalyst concentrate, prepared as described in Example 1, was mixed with 15 parts of an isocyanate-terminated prepolymer (prepared from 85 parts of Mondur MRS and 15 parts of polyoxypropylene glycol, having a molecular weight of 2,000) to give an isocyanate-catalyst system having about 4% by weight potassium lactate catalyst. The system was used as an adhesive to bond steel to steel by coating a strip of steel over the coating, and heating the assembly to 150°C. for 15 minutes. The following bond strengths at various temperatures were obtained:

| Temperature, °C. | Overlap Shear Strength-psi (kg./cm.²) |
|---|---|
| −55 | 2760 (193) |
| 24 | 2080 (134) |
| 82 | 1940 (136) |
| 121 | 1500 (105) |
| 149 | 1540 (108) |
| 177 | 1440 (101) |

EXAMPLE 11

A coating composition suitable for providing corrosion resistant coatings on metallic surfaces was prepared from:

| 400 parts | isocyanate-terminated prepolymer prepared from 300 parts Mondur MRS and 100 parts polypropylene glycol having a molecular weight of 1025, |
| 40 parts | high aspect ratio mica, |
| 150 parts | 4X mica powder, |
| 25 parts | potassium titanate fibers (available from duPont Do. as "Fybex" brand fibers), and |
| 100 parts | isocyanate-catalyst system concentrate prepared as described in Example 1. |

The materials were mixed and degassed under reduced pressure. On coating at a thickness of 5 mils on steel pipe and heating at 100°C. for 10 minutes, a filled isocyanurate resin coating was obtained which was resistant to mechanical impact and to organic solvents, alkali solutions and boiling water, over a 24-hour period.

EXAMPLE 12

A one-part isocyanurate foaming composition was prepared as follows:

400 parts of an isocyanate-terminated prepolymer (prepared from 240 parts Mondur MRS and 160 parts polyoxypropylene glycol having a molecular weight of 2000) were mixed with 100 parts of the isocyanate-catalyst system concentrate of Example 1 and 5 parts of a silicon rigid urethane foam surfactant, L-5340 (available from Union Carbide Co.).

250 parts of the isocyanate-catalyst-surfactant system were homogeneously mixed with 15 parts of a hexane mixture having a boiling range of 30° – 60°C. Upon heating the composition at 300°F. for 5 minutes, a rigid isocyanurate foam having a 4 pound per cubic foot density was obtained.

EXAMPLE 13

250 parts of the isocyanate-catalyst-surfactant system of Example 2 were homogeneously mixed with 15 parts of Freon 113 (a fluorinated-chlorinated hydrocarbon available from E. I. duPont Company). Upon heating at 300°F. for 5 minutes, a rigid isocyanurate foam having a density of approximately 6 pounds per cubic foot was obtained.

What is claimed is:

1. A room-temperature latent, curable system comprising:
   an aromatic polyisocyanate material; and
   an encapsulated liquid catalyst, having a viscosity greater than about 5,000 centipoise at 25°C., for the trimerization of said polyisocyanate dispersed throughout said system, said liquid catalyst being encapsulated in capsules having a permeable shell wall comprising partially polymerized isocyanate, said permeable capsule shell wall being impermeable to said liquid catalyst at room temperature but permeable to said catalyst at temperatures above about 75°C.

2. The system of claim 1, wherein said aromatic polyisocyanate is a polymethylene polyphenyl polyisocyanate.

3. The system of claim 1, wherein said liquid catalyst is a metal salt of an organic acid in polyol solution.

4. The system of claim 3, wherein said catalyst is a potassium lactate in glycerol.

5. The system of claim 1, wherein said system contains a particulate filler.

6. The system of claim 1, wherein said system contains a fibrous filler.

7. The system of claim 1, wherein said system contains a pigment.

8. A method for forming a room temperature latent, isocyanate-catalyst system comprising the steps of:
   blending a liquid isocyanurate trimerization catalyst, having a viscosity of at least about 5,000 centipoise at 25°C., and an aromatic polyisocyanate under conditions of high shear to form a dipersion of droplets of catalyst in said polyisocyanate; and
   removing the shearing force allowing a capsule shell wall of partially polymerized isocyanate to form about said droplets.

9. The method of claim 8, wherein the steps are carried out at a temperature above the melting point of the aromatic polyisocyanate but below about 50°C.

10. The method of claim 8, having the additional step of adding a particulate filler to the formed isocyanate catalyst system.

11. A process for curing a room-temperature latent curable system comprising an aromatic polyisocyanate and an encapsulated liquid catalyst in a capsule having a permeable shell wall impermeable to said catalyst at room temperature, comprising the step of:
   applying an activating force to said isocyanate-catalyst system whereby said liquid catalyst permeates the shell walls and catalyzes the isocyanate to isocyanurate.

12. The method of claim 11, wherein said activating force is a polar solvent.

13. The method of claim 11, wherein said activating force is heating the isocyanate-catalyst system to a temperature above 75°C.

14. The method of claim 11, wherein said activating force is ultrasonic radiation.

15. The method according to claim 11, wherein said activating force is microwave radiation.

16. The method of claim 11, where said activating force is mechanical shear.

17. The composition of claim 1 containing a chemical blowing agent and surfactant for polyisocyanurate foam formation.

18. The composition of claim 11 in which the blowing agent is a non-polar solvent which has a boiling point lower than about 75°C.

19. The process of claim 11 where said system is placed in a plywood defect prior to applying the activating force.

20. The system of claim 1, wherein said liquid catalyst is a metal salt solution of an organic acid in a polar solvent.

* * * * *